United States Patent [19]
Gancy et al.

[11] 3,937,785
[45] Feb. 10, 1976

[54] TREATMENT OF CHROMIUM ORE RESIDUES TO SUPPRESS POLLUTION

[75] Inventors: Alan Brian Gancy, Syracuse; Christian Albert Wamser, Camillus, both of N.Y.

[73] Assignee: Allied Chemical Corporation, New York, N.Y.

[22] Filed: Sept. 17, 1974

[21] Appl. No.: 506,922

[52] U.S. Cl. .................. 423/53; 423/1; 423/55; 423/659
[51] Int. Cl.² ................. C01G 37/00; C01G 37/14
[58] Field of Search ............... 423/1, 659, 55, 53

[56] References Cited
UNITED STATES PATENTS
2,639,216  5/1953  Banner.................................. 423/55
3,791,520  2/1974  Nieuwenhuls..................... 423/55 X

*Primary Examiner*—Edward Stern
*Attorney, Agent, or Firm*—Gerhard H. Fuchs

[57] ABSTRACT

Method for treating solid ore residue obtained by production of chromium chemicals from chromite ore, to reduce leaching of chromium compounds therefrom after disposal, which involves reducing the particle size of the residue prior to disposal so that at least about 20 percent by weight of the residue passes through a 200 mesh (U.S.) screen.

10 Claims, No Drawings

TREATMENT OF CHROMIUM ORE RESIDUES TO SUPPRESS POLLUTION

BACKGROUND OF THE INVENTION AND DISCUSSION OF THE PRIOR ART

In the manufacture of chromium chemicals from chromite ore by the conventional alkali roasting process, chromite ore containing about 40 to 50 percent chromic oxide ($Cr_2O_3$) is drymilled to fine particle size, mixed with finely divided sodium carbonate, lime and leached residue from previous operation, and is roasted at temperature in the order of about 2000°F. in an oxidizing atmosphere to oxidize the chromic oxide to form water-soluble hexavalent chromium compounds. The roast is then leached to extract the water-soluble chromium compounds, leaving a residue for which there is presently no use, and which generally is disposed of by dumping. In spite of use of efficient leaching methods, the residue still contains minor amounts of water-soluble chromium compounds which will bleed therefrom when the residue is wetted, as by exposure to rain. Such bleeding is objectionable because the soluble chromium compounds are toxic and raise a serious pollution problem. Some of the residual water-soluble chromium compounds in the residue have relatively low degree of solubility and bleed very slowly, hence cannot be readily leached to exhaustion. They nevertheless have sufficient solubility to pollute the environment by bleeding long after the residue has been discarded. Such bleeding can pose severe problems of ground water pollution. To stockpile these residues under conditions that they could not be wetted would be difficult and expensive.

The slowly bleeding chromium compounds contained in the residue obtained in the manufacture of chromium chemicals from chromite ore include calcium chromate, $CaCrO_4$, and calcium alumino-chromate, $3CaO.Al_2O_3.CaCrO_4 \cdot 12H_2O$, which are very slowly soluble in water; tribasic calcium chromite, $Ca_3(CrO_4)_2$, which decomposes slowly in the presence of water to produce water-soluble hexavalent chromium and insoluble trivalent chromium hydroxide; and basic ferric chromate, $Fe(OH)CrO_4$, which hydrolyses slowly in water to release chromate ions. The waste residue also contains some trivalent chromium compounds, but these are soluble to lesser extent only and are not major contributors to pollution. These residual, slowly soluble chromium compounds generally are present in amount of from about 0.7 to 1.5 percent by weight of chromium. In addition, the residue usually contains minor amounts of soluble alkali metal chromate which was not completely removed in the leaching operation. The residue, when wetted, may bleed chromium salts to the extent that the aqueous bleed can contain up to thousands of ppm of chromium compounds, expressed as Cr, depending on the relative amounts of water and residue, efficiency of contact, and time of contact.

The prior art has attempted to solve the chromium bleeding problem by reducing the hexavalent chromium compounds to form trivalent chromium compounds which bleed only to negligible extent on exposure to water. Usually, this involved roasting the residue in the presence of a reducing agent. A number of reducing agents have been suggested for this purpose, such as coal, gaseous hydrocarbons, sulfuric acid or sulfuric pitch containing hydrocarbon waste material and heavy waste oil. It has also been proposed to use chemical reducing agents which do not require roasting to reduce the chromate in the residue, such as ferrous sulfate or spent hydrochloric pickle liquor. While effective, all of these methods require use of additional reagents, and, in the case of the reductive roasting operation, require additional amounts of fuel.

SUMMARY OF THE INVENTION

In accordance with the present invention there is provided a method for treating the solid residue obtained in the production of chromates from chromite ore by roasting the ore under alkaline oxidizing conditions to form water-soluble chromate, followed by extraction of the chromate, which comprises reducing the particle size of the solid residue prior to disposal so that at least about 20 percent by weight of the residue, dry basis, passes through a 200 mesh (U.S.) screen. The method of the present invention is most effective if the size reduction is carried out in the presence of water.

Size reduction of the residue in accordance with the present invention reduces bleeding of chromate on contact with water at the disposal site, thereby reducing or eliminating a serious pollution problem. The reasons for this surprising reduction of bleeding propensity of chromium ore residue treated in accordance with the method of our invention are not entirely understood. However, we believe that particle size reduction increases the surface area of certain major constituents of the residue, particularly its major constituent tetracalcium alumino ferrite, which is believed to react with the chromate ions to form a highly insoluble chromium compound. While we do not wish to be bound by this explanation, we presently believe that the reactions which result in reduced chromate bleeding of the solid residue in accordance with the method of the present invention include hydrolysis of tetracalcium alumino ferrite at the newly formed surface of the solid residue and interaction of the intermediate hydrolysis product with chromate to form a calcium alumino ferrichromate of the formula $3CaO \cdot xAl_2O_3 \cdot yFe_2O_3 \cdot CaCrO_4 \cdot zH_2O$, which has low solubility in water.

DETAILED DESCRIPTION OF THE INVENTION AND OF THE PREFERRED EMBODIMENTS

Even though the chromite ore prior to the alkaline roasting operation is usually subjected to particle size reduction so that it substantially completely passes through 200 mesh (U.S.) screen, agglomeration occurs in the roasting operation and the leached residue usually contains no more than about 2 to 5 percent by weight, dry basis, of particles passing through a 200 mesh (U.S.) screen. Particle size reduction of the leached residue in accordance with the method of the present invention can be effected by any suitable means. Suitable types of mills for effecting such size reduction include ball mills and rod mills, cone mills, hammer mills, pin mills, roller mills and the like. Ball mills and rod mills are eminently suitable because of their relative efficiency and capability of carrying out the grinding operation in the presence of water, as is preferred. If desired, milling may be combined with particle size classification and return of oversize particles to the milling operation, as is conventional procedure.

Particle size reduction in accordance with our invention may be carried out on the residue as obtained from the leaching operation, in which event it contains small amounts of water in the order of about 12 to 15 percent by weight. It may also be carried out on the leached residue after it has been dried. Desirably, it is carried out in the presence of about 15 to 50 percent, preferably about 20 to about 40 percent, and most preferably about 30 to 35 percent by weight of water, based on the combined weight of the water and solids. At water levels lower than about 20 percent the material may have a tendency to compact, and grinding efficiency may be impaired. Use of water in amounts of more than about 40 percent is not ordinarily preferred because the ground solids are obtained in slurry form and may be difficult to transport. However, in the event it is desired to pump the ground solids in slurry form to the disposal site, water in amount of more than 40 percent may be advantageously employed.

We have found that in order to significantly reduce chromate leaching from the solid residue in accordance with the method of our invention, the solid residue should be reduced in particle size so that at least about 20 percent by weight of the particles, dry basis, pass through 200 mesh (U.S.) screen. We theorize that under these conditions sufficient amount of tetracalcium alumino ferrite component of the residue will have its surface exposed for reaction with chromate present in the residue. More preferably, the residue is ground so that at least about 30 percent by weight of the residue, more preferably yet at least about 40 percent by weight of the residue, dry basis, passes through a 200 mesh (U.S.) screen.

The Examples set forth below illustrate the best mode presently contemplated for the practice of our invention.

EXAMPLE I

To illustrate the chromate bleeding characteristics of typical solid residue obtained in the production of chromates from chromite ore, the following experiments were conducted. The solid residue used in these experiments had been obtained from the chromium chemical process which involved roasting of chromite ore in the presence of sodium carbonate and lime under oxidizing conditions to form water-soluble chromate, followed by aqueous extraction of the chromate. The solid residue contained 16.5 weight percent water, 0.10 weight percent water-soluble chromate expressed as Cr, and 0.92 weight percent acid-soluble chromate expressed as Cr. About 80 percent of this residue was coarser than 60 mesh (U.S.) and only about 3 percent was finer than 200 mesh (U.S.).

A 120 gram portion of the residue, equivalent to 100 grams dry residue, was mixed with 480 ml. of water and the resultant slurry was stirred gently. Chromate bled rapidly into the water phase, reaching a concentration of 230 ppm (as Cr) within 15 minutes. Chromate concentration in the aqueous phase increased only slowly thereafter to about 250 ppm in 30 minutes and 260 ppm in 3 hours. This test shows the chromate bleeding characteristics of the residue prior to treatment in accordance with the method of our invention.

A portion of that same residue was dried at 105°C. and ground in a laboratory ball mill until about 33 percent by weight was reduced to −200 mesh (U.S.) particle size. A 100 gram portion of this ground residue was mixed with 500 ml. of water and the resultant slurry was stirred gently. Chromate bled rapidly into the aqueous phase, reaching a concentration of about 200 ppm (as Cr) within minutes, but then decreased steadily to a level of about 20 ppm in one hour and about 5 ppm in three hours.

Another portion of that dried residue was ground in a laboratory ball mill until over 95 percent of the material passed through a 200 mesh (U.S.) screen. One hundred grams of this ground material were mixed with 500 ml. of water and the resultant slurry was stirred gently. Chromate bled rapidly into the aqueous phase, reaching a value of about 250 ppm (as Cr) within about 1 minute. However, chromate concentration in the aqueous phase then decreased rapidly to about 10 ppm in 15 minutes, 5 ppm in 30 minutes and about 1 ppm in 3 hours.

To a 300 gram portion of the wet residue containing about 16.5 percent water were added 58 ml. of additional water to form a slurry. The slurry was ground in a laboratory ball mill for about 3 hours so that about 35 percent by weight of the residue was reduced to particle size of less than 200 mesh (U.S.). One hundred forty-three grams of the resulting mud, equivalent to 100 grams of the residue on dry basis, were mixed with 457 ml. of water and the slurry was stirred gently. Small amounts of chromate bled into the aqueous phase reaching a maximum concentration of only about 8 ppm (as Cr) in 15 minutes and thereafter decreasing steadily to about 5 ppm in 2 hours.

The above experiments demonstrate that when residue treated in accordance with our invention process is contacted with water or ground in the presence of water, chromate which had initially diffused into the aqueous phase retransfers into the residue phase until certain equilibrium is established, which equilibrium under optimum condition may be in the order of about 1 ppm as Cr.

The "chromate bleeding index" as hereafter employed is a standardized water overlay test which involves shaking 8.3 grams of residue (dry basis) with 100 ml. of water for 1 minute, allowing it to stand for 3 hours, followed by filtration and analysis of the liquid for chromate. The amount of chromate found, expressed as ppm Cr, is the chromate bleeding index. Suitable method for determining chromate in the liquid include the colorimetric determination of the violet color formed with diphenylcarbazide, as is conventional procedure.

EXAMPLE II

Solid residue containing about 16.8 percent water, 0.11 percent water-soluble chromate expressed as Cr, and 1.07 percent acid-soluble (total) chromate expressed as Cr, was fed into a ball mill containing about 400 pounds of steel balls at a rate of 280 pounds per hour along with about 90 pounds of water per hour. Average retention time of the material in the mill was 16 minutes. The ground mud product discharged from the mill was found to contain 37 percent water and had particle size of 53 percent by weight passing through 200 mesh (U.S.) screen on dry residue weight basis. The chromate bleeding index of the solid residue fed to the mill was 120; the chromate bleeding index of the product discharged from the mill, determined immediately after discharge from the mill, was 20. Product discharged from the mill was stored in closed containers and samples were withdrawn periodically to determine the chromate bleeding index. Results are summarized in Table 1 below.

TABLE I

| Age | Chromate Bleeding Index |
| --- | --- |
| 0 | 20 |
| 1 day | 17 |
| 2 days | 15 |
| 1 week | 10 |
| 2 weeks | 7 |
| 4 weeks | 5 |
| 10 weeks | 2 |

We have further discovered that if the solid residue contains minor amounts of caustic, as it usually does, typically in the form of sodium hydroxide, then if the ground residue is stored in the presence of air, its initially reduced bleeding index will tend to increase again over periods of time. Although we do not wish to be bound by this explanation, we believe this is due to reaction of the sodium hydroxide with carbon dioxide in the air to form sodium carbonate, which in turn in some way reacts with the bound chromium compounds to render them soluble. Thus, we have found that when the product obtained from Example II was stored outdoors in shallow troughs lined with sheet polyethylene, and core samples were withdrawn periodically and analysed for chromate bleeding properties, the chromate bleeding index increased with time, as shown in Table 2 below:

TABLE 2

| Outdoor Storage Time | Chromate Bleeding Index |
| --- | --- |
| 1 day | 7 |
| 1 week | 30 |
| 2 weeks | 50 |
| 3 weeks | 60 |
| 4 weeks | 90 |
| 8 weeks | 130 |

We have found that if the ground solid residue is stored outside under conditions such that access to air is excluded, as in covered trenches, then the chromate bleeding index remains at its initial low level, as is the case when the ground residue is stored in sealed containers as shown in Table 1, above. However, we have further found that the chromate bleeding index can be maintained near its minimum level in outside storage with access to air if the alkali which may be present is neutralized, as shown in Example 3.

EXAMPLE III

A sample of the same solid residue as was used for Example II was ground in a laboratory ball mill in the presence of added water to obtain a slurry containing 37 weight percent water (on slurry basis) to particle size of 53 percent through 200 mesh (U.S.). The chromate bleeding index of the slurry recovered from the mill was 5. It had a pH of about 12. The slurry was then treated with 20 percent hydrochloric acid in amount sufficient to reduce its pH to 10. The neutralized slurry was stored outside in the presence of air. Samples were withdrawn periodically for determination of chromate bleeding index. Results are summarized in Table 3.

TABLE 3

| Outdoor Storage Time | Chromate Bleeding Index |
| --- | --- |
| 1 day | 5 |
| 1 week | 7 |
| 2 weeks | 10 |
| 3 weeks | 15 |
| 4 weeks | 17 |
| 8 weeks | 15 |

The data in Tables 2 and 3 demonstrate the importance of neutralizing any alkaki which may be present in the residue for preserving the low bleeding properties of the ground residue. Hence, in preferred embodiment the ground residue is treated to reduce its pH to a level about 7 to 11, preferably about 8 to 10. To that end the ground residue may be slurried in water and acid added thereto, if the residue was ground dry, or acid may be added directly to the mill or to the ground residue slurry, as may be convenient under the circumstances, if the residue is ground in the presence of water, as is preferred. Any acid is suitable for that purpose, hydrochloric acid being preferred.

The data in Table 1 above shows that immediate reduction in chromate leaching index occurs on particle size reduction of the residue, but that reduction in chromate leaching index continues to take place over extended periods of time. In order to minimize leaching at the disposal site of freshly ground residue, it may be desirable to provide for intermediate storage of the ground residue prior to disposal at the disposal site under conditions such that water therefrom will not be carried into the environment, as by holding it in leakproof storage containers until the chromate leaching index is reduced to desired level. Usually it will therefore be desirable to store the ground residue in slurry form before disposal, e.g. in holding bins for a period of 2 or 3 days until chromate leaching has reached equilibrium.

Since various changes and modifications may be made in the invention without departing from the spirit and essential characteristics thereof, it is intended that all matter contained in the above description shall be interpreted as illustrative only, the invention being limited only by the scope of the appended claims.

We claim:

1. The method for reducing bleeding of water-soluble chromium compounds from the solid residue obtained in the production of chromates from chromite ore by roasting the ore under alkaline oxidizing conditions to form water-soluble chromate, followed by extraction of the chromate, which comprises reducing the particle size of the solid residue prior to disposal so that at least about 20 percent by weight of the residue, dry basis, passes through a 200 mesh (U.S.) screen.

2. The method of claim 1 wherein the particle size of the solid residue is reduced so that at least about 40 percent by weight of the residue, dry basis, passes through a 200 mesh (U.S.) screen.

3. The method of claim 1 wherein particle size reduction is carried out in the presence of added water.

4. The method of claim 3 wherein water is added to the residue in amount sufficient to obtain water concentration of about 15 to 50 percent by weight of the combined weight of solids and water.

5. The method of claim 3 wherein water is added to the residue in amount sufficient to obtain water concentration of about 20 to 40 percent by weight of the combined weight of solids and water.

6. The method of claim 3 wherein residue is neutralized by addition of acid to reduce its pH to from 7 to 11.

7. The method of claim 1 wherein particle size reduction is effected in a ball mill or rod mill.

8. The method of claim 7 wherein particle size reduction is carried out in the presence of water.

9. The method of claim 7 wherein the particle size of the solid residue is reduced so that at least about 40 percent by weight of the residue, dry basis, passes through a 200 mesh (U.S.) screen, and wherein particle size reduction is carried out in the presence of added water in amount sufficient to obtain water concentration of 20 to 40 percent by weight of the combined weight of solids and water, and wherein the residue is neutralized by addition of acid to reduce its pH to from 7 to 11.

10. The method of claim 9 wherein the residue is neutralized by addition of hydrochloric acid to a level of from 8 to 10.

* * * * *